United States Patent
Buragohain et al.

(10) Patent No.: US 8,437,261 B1
(45) Date of Patent: *May 7, 2013

(54) ADAPTIVE DATA STREAM SAMPLING

(75) Inventors: Chiranjeeb Buragohain, Seattle, WA (US); Peter F. Hill, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 237 days.

This patent is subject to a terminal disclaimer.

(21) Appl. No.: 12/860,116

(22) Filed: Aug. 20, 2010

Related U.S. Application Data

(63) Continuation of application No. 11/768,759, filed on Jun. 26, 2007, now Pat. No. 7,817,563.

(51) Int. Cl.
*H04J 3/14* (2006.01)

(52) U.S. Cl.
USPC .......................................... 370/241; 709/224

(58) Field of Classification Search .................... None
See application file for complete search history.

(56) References Cited

U.S. PATENT DOCUMENTS

| | | | |
|---|---|---|---|
| 4,965,830 A | 10/1990 | Barham et al. | |
| 5,949,757 A | 9/1999 | Katoh et al. | |
| 6,480,471 B1 | 11/2002 | VanZante et al. | |
| 6,728,780 B1 | 4/2004 | Hebert | |
| 6,748,435 B1 | 6/2004 | Wang et al. | |
| 6,791,943 B1 | 9/2004 | Reynolds | |
| 7,221,656 B1 | 5/2007 | Aweya et al. | |
| 7,324,441 B1 | 1/2008 | Kloth et al. | |
| 7,444,418 B2 | 10/2008 | Chou et al. | |
| 7,817,563 B1 * | 10/2010 | Buragohain et al. | 370/241 |
| 2003/0123392 A1 | 7/2003 | Ruutu et al. | |
| 2004/0095893 A1 | 5/2004 | Goringe et al. | |
| 2005/0119996 A1 | 6/2005 | Ohata et al. | |
| 2009/0116402 A1 | 5/2009 | Yamasaki | |

OTHER PUBLICATIONS

Acharya, Swarup et al., "Congressional Samples for Approximate Answering of Group-By Queries," Information Sciences Research Center, Nov. 30, 1999 (29 pages).

* cited by examiner

*Primary Examiner* — Kevin C Harper
(74) *Attorney, Agent, or Firm* — Thomas|Horstemeyer, LLP

(57) ABSTRACT

A facility for transmitting data items in a data stream is described. The facility compares the rate at which data items in the data stream are being generated to a threshold rate. When the rate at which data items in the data stream are being generated is no greater than the threshold rate, the facility transmits all of the data items in the data stream to a destination. When the rate at which data items in the data stream are being generated is greater than the threshold rate, the facility transmits only a randomly selected proper subset of the data items in the stream to the destination, such that data items are transmitted to the destination at a rate approximately equal to the threshold rate.

20 Claims, 8 Drawing Sheets

ADAPTIVE DATA STREAM SAMPLING

CROSS REFERENCE TO RELATED APPLICATIONS

This application is a continuation of, and claims priority to, U.S. patent application entitled "ADAPTIVE DATA STREAM SAMPLING" filed on Jun. 26, 2007 and assigned application Ser. No. 11/768,759, now U.S. Pat. No. 7,817,563, which is incorporated herein by reference in its entirety.

TECHNICAL FIELD

The described technology is directed to the field of data stream analysis.

BACKGROUND

A data stream is a sequence of data items conveying information. For example, a data stream may represent a sequence of requests from a uniquely identified user, or a data stream may convey information representing the performance of a computing system responding to requests. This information may include, for example, the computing system's response time, load, availability, memory usage, response codes, error codes, packet loss, retransmission, and throughput.

A data stream may be analyzed to produce useful information. For example, a data stream representing a computing system's response time for each request received by the computing system (i.e., the time elapsed between the computing system receiving a request and responding to it) may be analyzed to generate metrics for evaluating the performance of the computing system.

Typically, service providers monitor the status of their networks to ensure that their operational policies (e.g., performance, availability, security) are fulfilled, and to identify and resolve issues that may arise. Data stream analysis is particularly useful in this context. For example, a service provider may determine that it is not satisfying a Service Level Agreement specifying a certain maximum average response time by analyzing a data stream or data streams representing the response time for each service request received.

In conventional monitoring systems, every data item in an analyzed data stream is processed. This approach requires significant resources, and these resources often become overwhelmed as the rate at which the data items are produced by computing systems exceeds the processing capacity of the monitoring system. In the example above, the data production rate for a data stream representing the response time for each request will vary based on the rate at which requests are received by the computing system. To illustrate this point, consider a first computing system that receives ten requests per second and a second computing system that receives one hundred requests per second. The data stream data production rate of the second computing system is ten times the data production rate of the first computing system.

When a monitoring system reaches its processing capacity, it is common for the monitoring system to enter a deferred delivery mode by reducing the rate at which data items are delivered to the monitoring system for processing. This approach often permits the monitoring system to continue processing every data item in the analyzed data stream without becoming overwhelmed.

DETAILED DESCRIPTION

Figure 1:
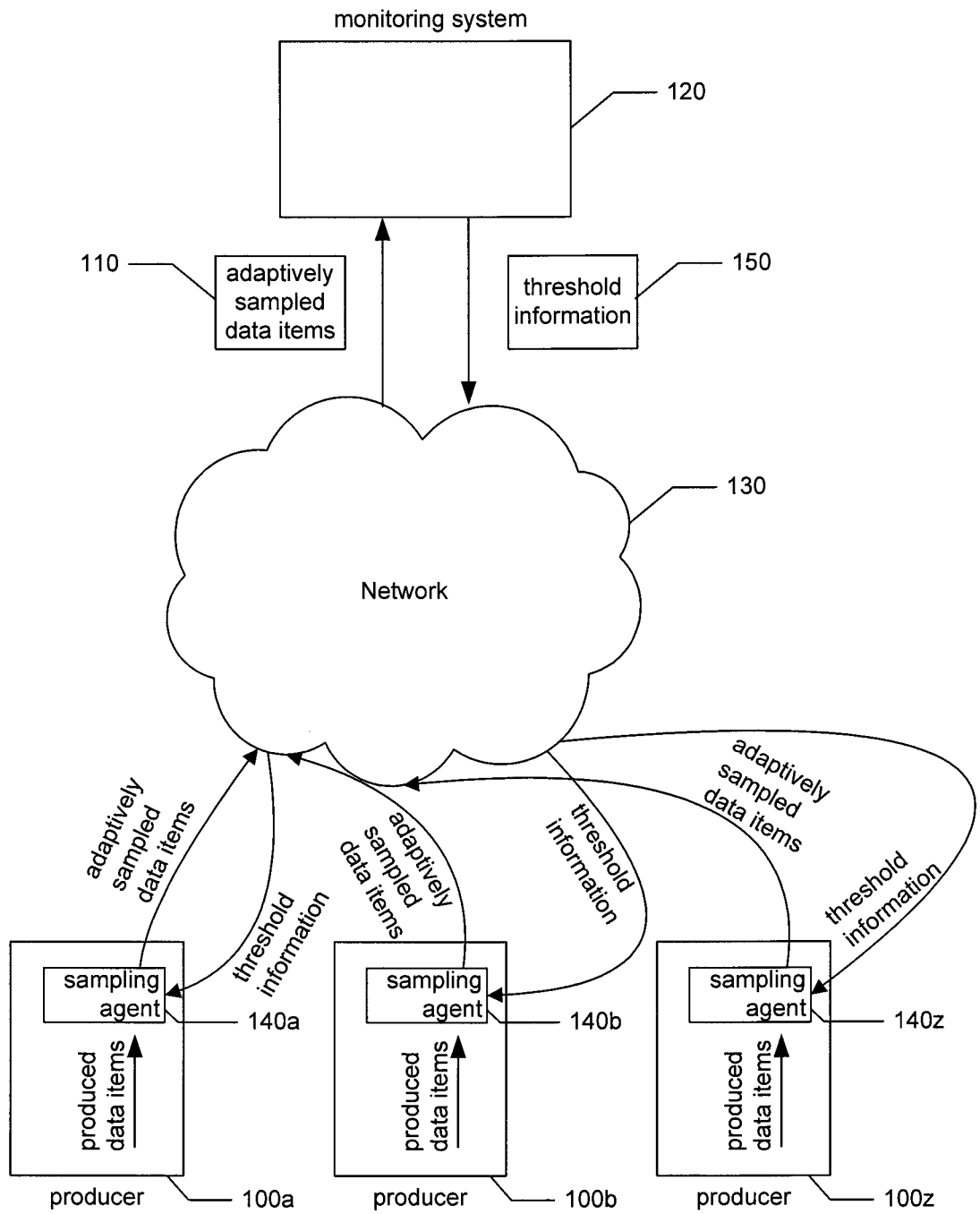
FIG. 1 is a high-level data flow diagram showing data in a typical environment in which the facility operates, in accordance with one or more embodiments.

Applicants have recognized that deferring delivery of data items to reduce the data production rate to one that matches the monitoring system's processing capacity results in untimely monitoring because the data items are not processed for analysis promptly after being produced. Accordingly, an approach to analyze data items without deferring delivery has been developed.

A software facility for analyzing data streams, such as data streams of time series data items, ("the facility") is described. In some embodiments, the facility includes one or more computing systems that produce data streams, sometimes referred to as "producers." For example, a producer may correspond to one or more web servers of a service provider that are responsible for accepting and responding to requests. In some embodiments, the facility includes a monitoring system for processing data streams. For example, a monitoring system may process data streams representing the response time for each request received by a web server to generate metrics for evaluating the performance of the web server. In some embodiments, the facility includes a data store for storing information conveyed by each analyzed data stream.

Typically, the processing capacity of the monitoring system is predetermined. In some embodiments, the facility regulates the amount of data conveyed in each analyzed data stream to ensure that the processing capacity of the monitoring system is not exceeded. For example, the facility may regulate the amount of data conveyed in each analyzed data stream by operating a sampling agent on each producer. A sampling agent at each producer imposes one or more threshold data transmission rates ("threshold rates") on its producer that establish a maximum rate at which data is to be conveyed from that producer to the monitoring system.

In some embodiments, diverse threshold rates may be imposed for each producer. For example, in a facility comprising two producers and a monitoring system having a processing capacity of 36 items/sec., a threshold rate of 18 items/sec. may be imposed on each producer. Alternatively, a threshold rate of 4 items/sec. may be imposed on one producer and a threshold rate of 32 items/sec. may be imposed on the other producer. The sum of each producer's threshold rate may or may not equal the processing capacity of the monitoring system. Indeed, it may be advantageous in some cases to overbook the processing capacity of the monitoring system. For example, it may be advantageous in cases where each producer's threshold rate is rarely imposed at the time. In some embodiments, threshold rates are imposed dynamically by the facility.

In some embodiments, the facility samples an analyzed data stream to regulate the amount of data conveyed in the analyzed data stream. When a producer's data production rate exceeds an imposed threshold rate, the facility samples the analyzed data stream by discarding data items from it so that the data production rate no longer exceeds the imposed threshold rate. In some embodiments, the facility samples the analyzed data stream before it is conveyed to the monitoring system so that the amount of data conveyed to the monitoring system does not exceed the producers imposed threshold rate. By sampling analyzed data streams instead of reducing the rate at which data items are delivered to the monitoring system for processing, the facility analyzes data items promptly after they are produced.

In some embodiments, every data item in an analyzed data stream has the same probability of being discarded. In some embodiments, the probability of a data item being discarded may be based on the frequency of data items of the same type within the analyzed data stream. For example, the facility may maintain a list of requests received by a producer and their frequency of occurrence. In this example, when the producer's data production rate exceeds an imposed threshold rate, the facility discards data items derived from frequent requests at a higher rate than data items derived from rare requests. In some embodiments, certain types of data items are designated as protected, and these item types are not sampled. For example, data items indicating the presence of an alarm or error may correspond to protected item types. By considering the type of information conveyed by each data item of an analyzed data stream, the facility reduces the amount of data processed without significantly affecting the accuracy or timeliness of information conveyed.

In some embodiments, the facility maintains a list of requests received by a group of producers and their frequency of occurrence across the analyzed data streams of the group of producers. When the data production rate of a producer from the group of producers exceeds an imposed threshold rate, the facility discards data items produced for requests of types that are frequent across the data stream of the group at a higher rate than data items derived from requests of types that are rare across the data stream of the group, regardless of the actual frequency of each request type received by the producer whose data stream is being sampled.

In some embodiments, the threshold rates of one or more producers are configurable by the facility or the administrators of the producers individually. For example, an administrator of a producer may determine that the data production rate of the producer rarely reaches its threshold rate. In this example, the administrator may use a configuration service provided by the facility to reduce the producer's threshold rate. In some embodiments, the facility charges each administrator of each producer or group of producers based on their threshold rates or the amount of information being conveyed to the monitoring system. By charging administrators in this fashion, the facility may provide incentive for an administrator to select a lower threshold rate.

By sampling data streams in some or all of the ways identified above, the facility analyzes data items promptly, without exceeding the processing capacity of the monitoring system, and without sacrificing the accuracy of the information conveyed.

FIG. 1 is a high-level data flow diagram showing data flow in a typical environment in which the facility operates. A number of computer systems $100a, 100b, \ldots 100z$, sometimes referred to as "producers," generate and transmit data items 110 in a data stream to a monitoring system 120 via a network 130 such as the Internet or a local area network. In some embodiments, producers $100a, 100b, \ldots 100z$ are physically distinct computer systems. For example, producers $100a, 100b, \ldots 100z$ may correspond to one or more web servers of a service provider that are responsible for accepting and responding to a number of requests. In some embodiments, producers $100a, 100b, \ldots 100z$ are virtual machines executing on one or more computer systems. For example, producers $100b$ and $100z$ may correspond to web server virtual machines executing on a single computer system. Sampling agents $140a, 140b, \ldots 140z$ establish a maximum data transmission rate ("threshold rate") at which data items are to be transmitted by producers $100a, 100b, \ldots 100z$ to monitoring system 120. Typically, sampling agents $140a, 140b, \ldots 140z$ establish these threshold rates based on threshold information 150 conveyed by monitoring system 120. For example, threshold information 150 may indicate the rate at which monitoring system 130 can process data items 110 produced by producers $100a, 100b, \ldots 100z$. Data items 110 typically include information produced producers $100a, 100b, \ldots 100z$. For example, data items 110 may include performance information, such as the response time, load, availability, memory usage, response codes, error codes, packet loss, retransmission, and/or throughput of producer $100z$. Within the monitoring system 120, data items 110 may be analyzed to generate metrics for evaluating the performance of producers $100a, 100b, \ldots 100z$.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other devices may be used in place of the producers $100a, 100b, \ldots 100z$, such as application servers, communications servers, database server, proxy servers, file servers, game servers, emulators, etc.

Figure 2:
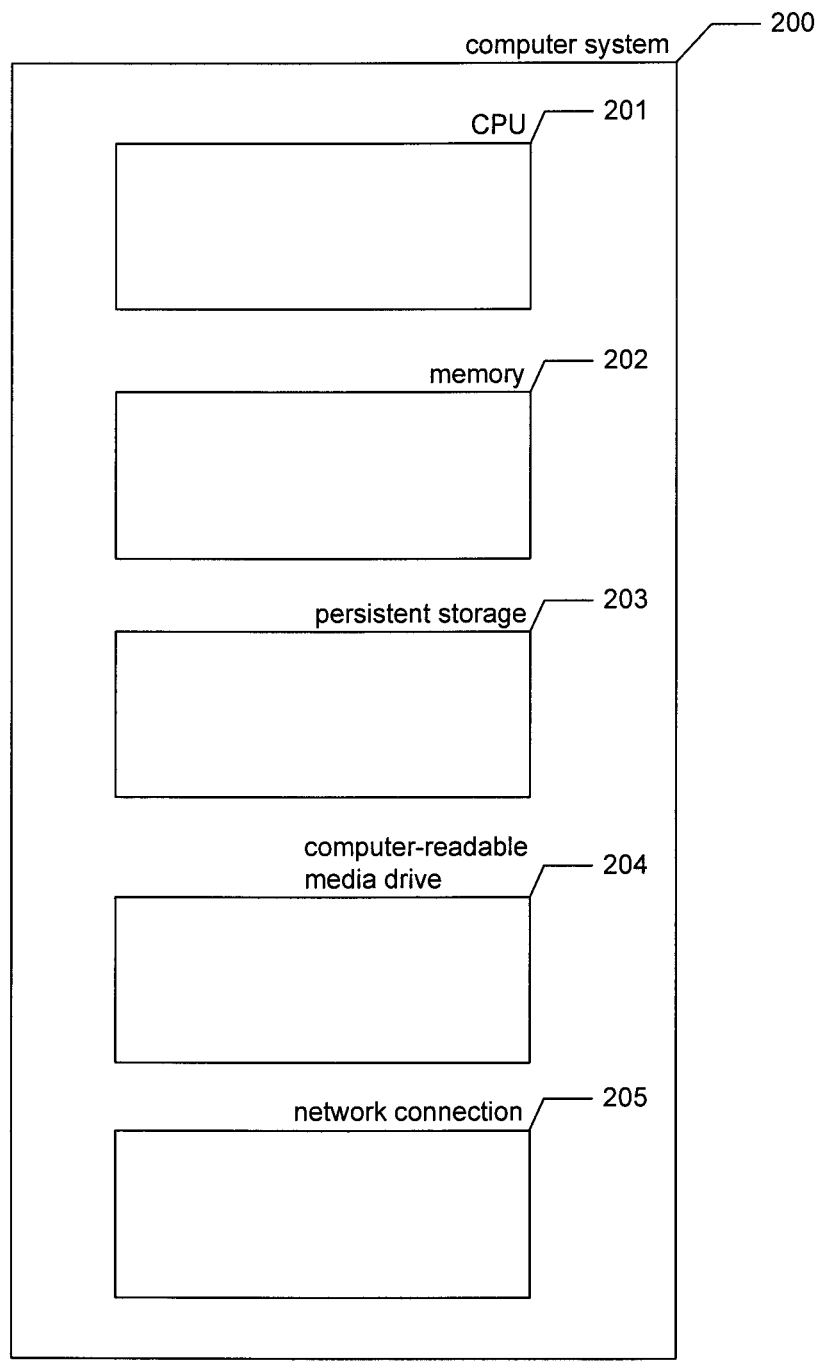
FIG. 2 is a high-level block diagram showing some of the components typically incorporated in at least some of the computer systems and other devices on which the facility executes, in accordance with one or more embodiments.

FIG. 2 is a high-level block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are typically used to support the operation of the facility, those skilled in the art will appreciate that the facility may be implemented using devices of various types and configurations, and having various components.

Figure 3:
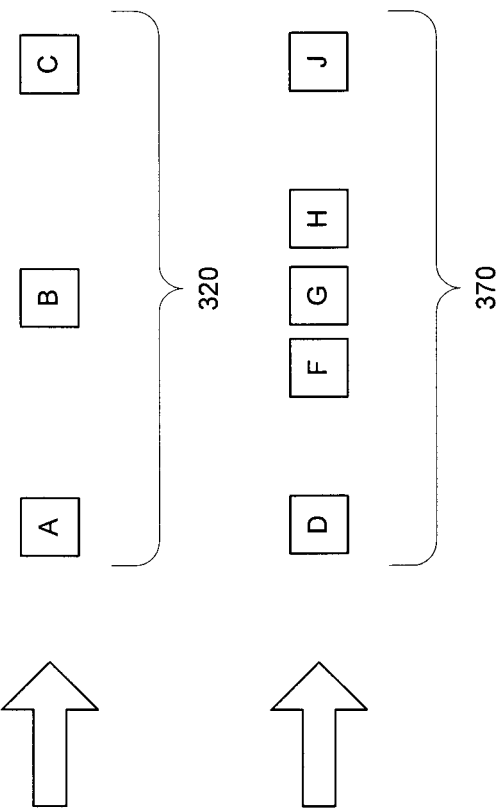
FIG. 3 is a block diagraph showing a data stream on which the facility operates, in accordance with one or more embodiments.
Figure 3:
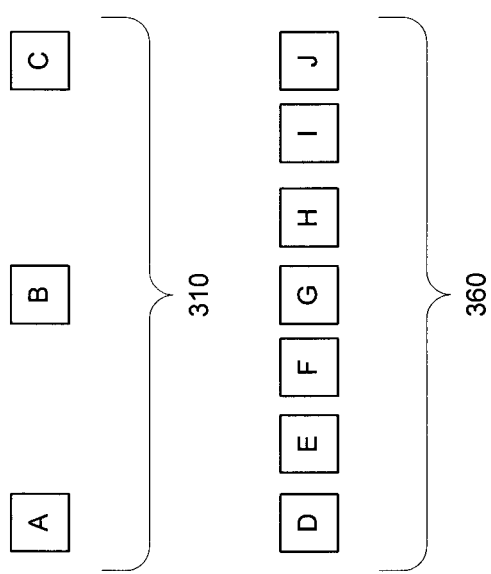

FIG. 3 is a block diagraph showing a data stream on which the facility operates. In particular, the diagram shows the operation of the facility with respect to two portions of the same data stream produced in two different 1-second time intervals. Portion 310 is produced in a first time interval during which the stream has a data production rate of 3 items per second, while portion 360 is produced in a second time interval during which the stream has a data production rate of seven items per second. For each time interval, the facility determines whether the data production rate exceeds a threshold rate. In the example shown in FIG. 3, the threshold rate is 5 items per time interval. During the first time interval, the data production rate does not exceed the threshold rate, so the facility transmits all of the data items in the produced data stream portion to monitoring system 120 as transmitted data stream portion 320. During the second time interval, the data production rate exceeds the threshold rate. As shown, when the data production rate exceeds threshold rate, the facility samples the data stream before transmitting the data items in the produced data stream portion to monitoring system 120 as transmitted data stream portion 370, so that the data items are transmitted at a rate approximately equal to the threshold rate.

Figure 4:
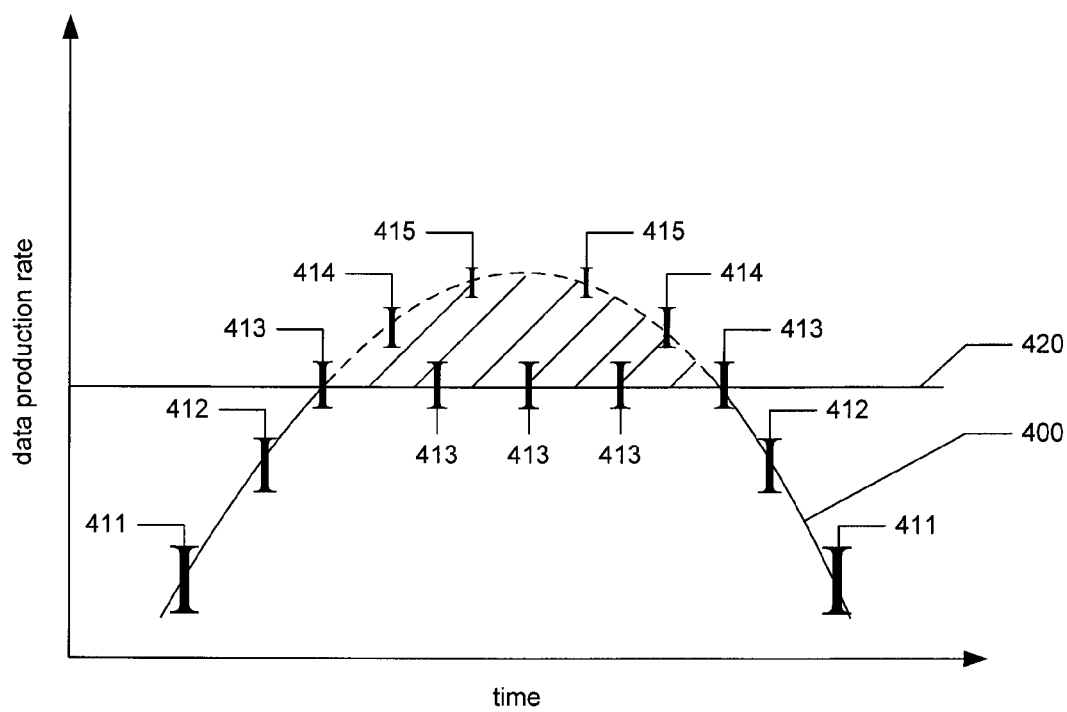
FIG. 4 is a graph showing the relative error introduced by sampling a data stream at a threshold rate, in accordance with one or more embodiments.

FIG. 4 is a graph showing the relative error introduced by sampling a data stream at a threshold rate. Typically, there is intrinsic error in metrics generated from data that has a random component. This error exists regardless of whether the data is sampled. For example, the data production rate of a data stream representing the response time for each request received by a producer varies unpredictably based on the number of requests received. Thus, there is intrinsic error in any metric generated by analyzing the data stream.

The graph in FIG. 4 shows a curve 400 corresponding to a rate at which data items in a data stream are being produced ("the data production rate"). In particular, the curve shows via error bars 411-415 error rates observed when analyzing an unsampled data stream having a variable data production rate matching its height. Error rates 411-415 vary based on the number of data items in the data stream. Specifically, the error rate is high when the data production rate is low (e.g., error rate 411), and the error rate is low when the data production rate is high (e.g., error rate 415). The error observed in analyzing an unsampled data stream is attributable to relative uncertainty, or "jitter."

As an example of a data stream corresponding to the shown curve, monitoring system 120 may analyze transmitted data items representing the response time for each request received by producer 100*z* to determine whether producer 100*z* satisfies a maximum response time specified in a Service Level Agreement. If the average request rate of producer 100*z* is $\lambda$ per second, then the probability P(k) that k responses will be transmitted satisfying the maximum response time in any given second may be illustrated by the Poisson distribution:

$$P(k) = \frac{\lambda^k}{k!} e^{-\lambda}$$

The average of this distribution is $\lambda$ and the standard deviation is $\sqrt{\lambda}$.

$$\text{request rate} = \lambda \pm \sqrt{\lambda} = \lambda\left(1 \pm \frac{1}{\sqrt{\lambda}}\right)$$

Thus, the relative uncertainty in the request rate is $1/\sqrt{\lambda}$, which increases as the request rate decreases. For example, if the average request rate is 10,000 requests per second, then the expected jitter is $\sqrt{10,000}$=100 requests per second (1% relative uncertainty). Therefore, when generating metrics by analyzing data streams having variable data production rates, jitter introduces some level of uncertainty into the results of the analysis irrespective of whether the data stream is sampled.

In some embodiments, the facility determines an acceptable relative error and determines the data analysis rate to which it corresponds. For example, the facility may determine that error rate 413 is an acceptable relative error because it cannot afford the processing resources required to reduce its error rate to error rate 415, or because the benefits of error rate 414 are not worth the additional expense. In this example, the facility establishes a threshold rate 420, causing the facility to discard any portion of the data production rate that exceeds this threshold rate. The relative error observed when sampling a data stream at threshold rate 420 is the same as the error observed when analyzing an unsampled data stream whose data production rate is equal to the threshold rate. For example, when the threshold rate is 500 items/sec., a data stream comprising 1,000 data items is sampled at 50%, and the resulting sampling error is $1/\sqrt{1000 \times 0.5} \approx 3.2\%$. By establishing threshold rate 420, sampling only introduces additional errors only when the data production rate exceeds threshold rate 420. Thus, the facility only discards data items when they are least necessary.

Indeed, sampling a stream having a high production rate often introduces little additional error. For example, if data items having an average request rate of 10,000 requests per second are sampled at the rate of p=50%, then the error rate before sampling is $1/\sqrt{10,000}$=1%, and the error rate after sampling is $1/\sqrt{10,000 \times 0.5}$=1.4%, assuming a uniform distribution of the types of data items being sampled.

Because a sampled data stream may include any number of item types, uniform random sampling may introduce significant error for rare item types. The facility ameliorates such rare item type error as described further below in connection with FIGS. 7 and 8.

Figure 5:
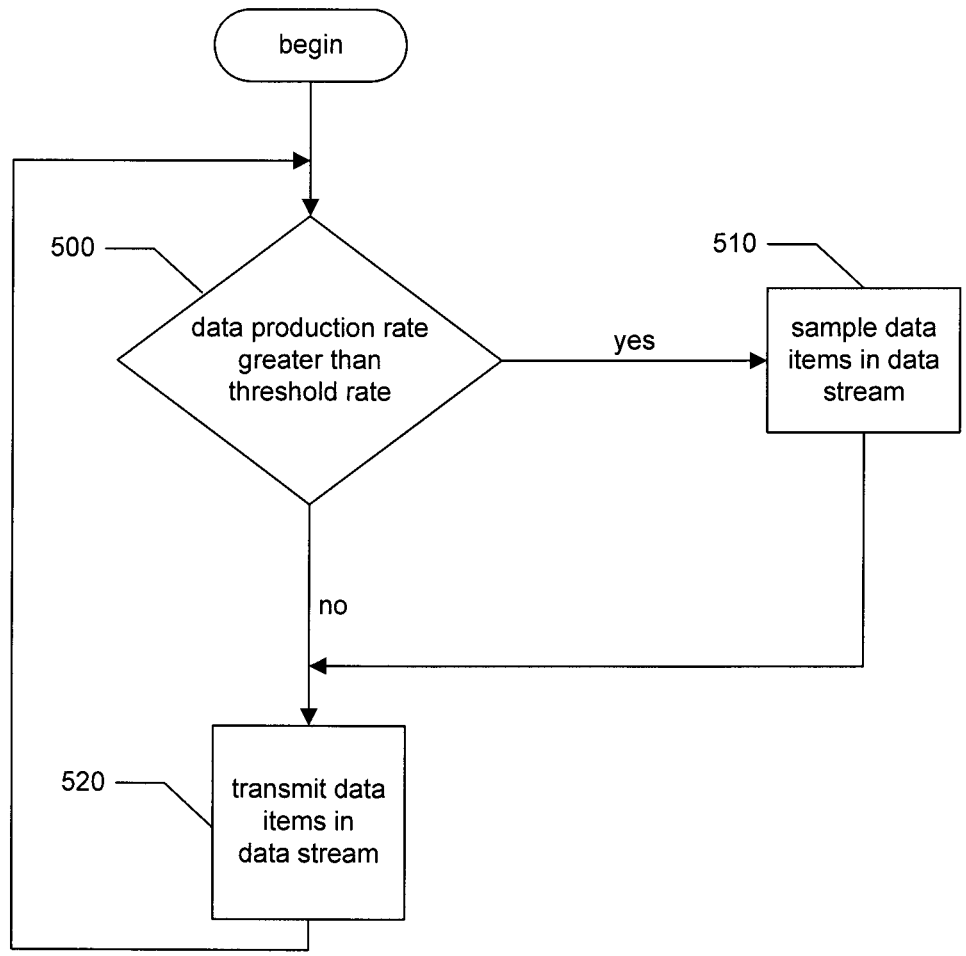
FIG. 5 is a flow diagram showing actions typically performed by the facility when transmitting a data stream having a variable data production rate, in accordance with one or more embodiments.

FIG. 5 is a flow diagram showing actions typically performed by the facility when transmitting a data stream having a variable data production rate. The facility typically performs these actions in a monitoring agent operating on the producer that is producing an analyzed data stream. At block 500, the facility compares the data production rate of an analyzed data stream to a threshold rate. When the data production rate of the data stream is no greater than the threshold rate, the facility transmits all of the data items in the data stream to a destination at block 520. When the data production rate is greater than the threshold rate, the facility samples the data stream at block 510 before transmitting the data items in the data stream to the destination at block 520. After block 520, the facility returns to block 500 and the data production rate of the analyzed data stream to a threshold rate. In some embodiments, threshold rates are imposed dynamically by the facility. For example, when the facility determines that the capacity processing rate of monitoring system 120 has changed, the facility may adjust the threshold rates attributed to one or more of producers 100*a*, 100*b*, . . . 100*z*. In some embodiments, the producer may use a configuration service provided by the facility to adjust its threshold rate.

Those skilled in the art will appreciated that the blocks shown in FIG. 5 and in each of the flow diagrams discussed may be altered in a variety of ways. For example, the order of blocks may be rearranged; substeps may be performed in parallel; shown blocks may be omitted; or other blocks may be included; etc.

In some embodiments, when the sum of each producer's data production rate is below a particular data production rate, the facility may temporarily "turn off" sampling and transmit all data items in a data stream regardless of whether the producer's data production rate exceeds its threshold rate. For example, this may occur when the facility determines that the monitoring system is not in jeopardy of being overwhelmed because only a small amount of the processing capacity is in use. In these instances, the facility will "turn on" sampling when it determines that the processing load of the monitoring system has exceeded a triggering threshold, typically established as a fraction of the monitoring system's capacity processing rate.

Figure 6:
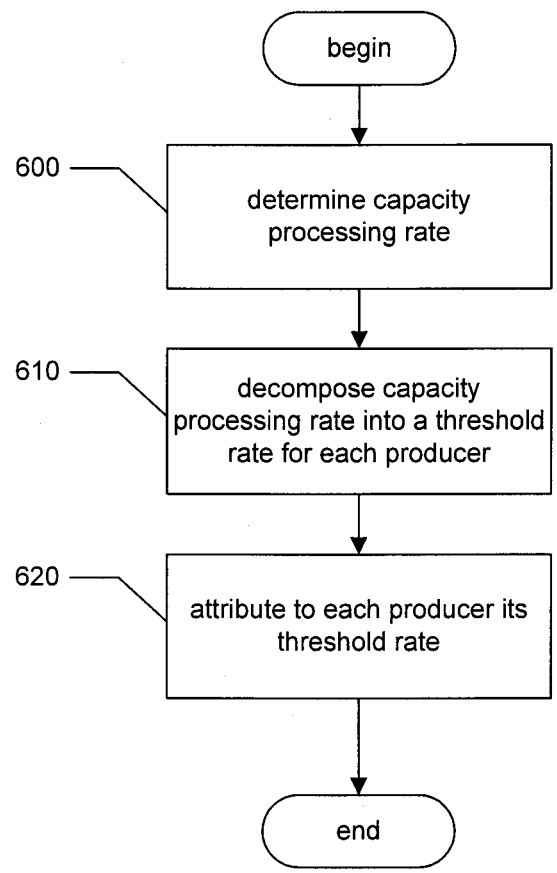
FIG. 6 is a flow diagram showing actions typically performed by the facility in order to establish a threshold rate, in accordance with one or more embodiments.

FIG. 6 is a flow diagram showing actions typically performed by the facility in order to establish a threshold rate. At block 600, the facility determines the capacity processing rate of the destination to which data streams are transmitted, such as monitoring system 120. In some embodiments, the capacity processing rate is the rate at which transmitted data items may be processed by the receiver. Typically, the capacity processing rate is predetermined and is based on the types of processing involved and resources available for processing transmitted data items.

At block 610, the facility decomposes the capacity processing rate into a number of threshold processing rates for each producer. For example, the facility may partition the capacity processing rate of monitoring system 120 into a number of threshold rates corresponding to producers 100a, 100b, . . . 100z. The sum of each producer's threshold rate may or may not equal the processing capacity rate. For example, in cases where producers' data production rates rarely exceed their threshold rates, it may be advantageous to "overbook" the processing capacity of the processing system by determining producer threshold rates that sum to a rate greater than the capacity processing rate.

In some embodiments, the capacity processing rate is divided equally among the producers. For example, if the processing capacity of monitoring system 120 is 90 items/sec., the capacity processing rate may be decomposed into three threshold rates of 30 items/sec. corresponding to producers 100a, 100b, and 100z. In some embodiments, the capacity processing rate is decomposed into diverse threshold rates. For example, it may be advantageous to attribute a larger threshold rate to producer 100b in cases where producers' 100a and 100z data production rate rarely exceeds their threshold rates; where producer 100b is producing a large number of protected data items; or where producer 100b has agreed to pay more for a higher threshold rate; etc. In this example, producer 100b may be attributed a threshold rate of 50 items/sec. and producers 100a and 100z may each be attributed a threshold rate of 20 items/sec.

In some embodiments, the capacity processing rate is decomposed in threshold rates based on the applications or services provided by groups of producers. A threshold rate attributed to a group of producers may then by decomposed and attributed to the producers within the group. Regardless of whether the division is between producers or groups of producers, the processing capacity may be divided equally or diversely. For example, where producer 100b corresponds to a first application and producers 100a and 100z correspond to a second application, the capacity processing rate of monitoring system 120 may be decomposed first based on the number of applications. In this example, assuming an equally attributed processing capacity of 1,000 items/sec., producer 100b is attributed a threshold rate of 500 items/sec. on behalf of the first application and the group of producers (100a and 100z) is attributed a threshold rate of 500 items/sec. on behalf of the second application, which is further attributed individually to producers 100a and 100z. Also, in some embodiments, the capacity processing rate is decomposed into item type thresholds. These thresholds may be attributed uniformly to a group of producers or to producers individually.

At block 620, the facility attributes to each producer its threshold processing rate. In some embodiments, the facility attributes a threshold rate to each producer by distributing the threshold rate to a sampling agent operating on the producer, such as sampling agents 140a, 140b, . . . 140z. The sampling agent may impose the threshold rate attributed to the producer, so that when the producer's data production rate is greater than its threshold rate, the sampling agent discards data items in the data stream before transmitting the data stream. After block 620, these blocks conclude.

In some embodiments, every data item in an analyzed data stream has the same probability of being discarded. However, as discussed above in connection with FIG. 3, jitter introduced by sampling worsens as the number of data items in a data stream having a variable data production rate decreases. Similarly, sampling may introduce large jitter in the value of a metric corresponding to a rare item type. Thus, in some embodiments, item types corresponding to a large number of data items may be sampled at a higher rate than item types corresponding to rare data items. In some embodiments, the facility designates certain item types as protected, such as error or alarm item types. Also, rare item types may be designated as protected in some cases. In some embodiments, only non-protected item types are discarded from a sampled data stream.

Figure 7:
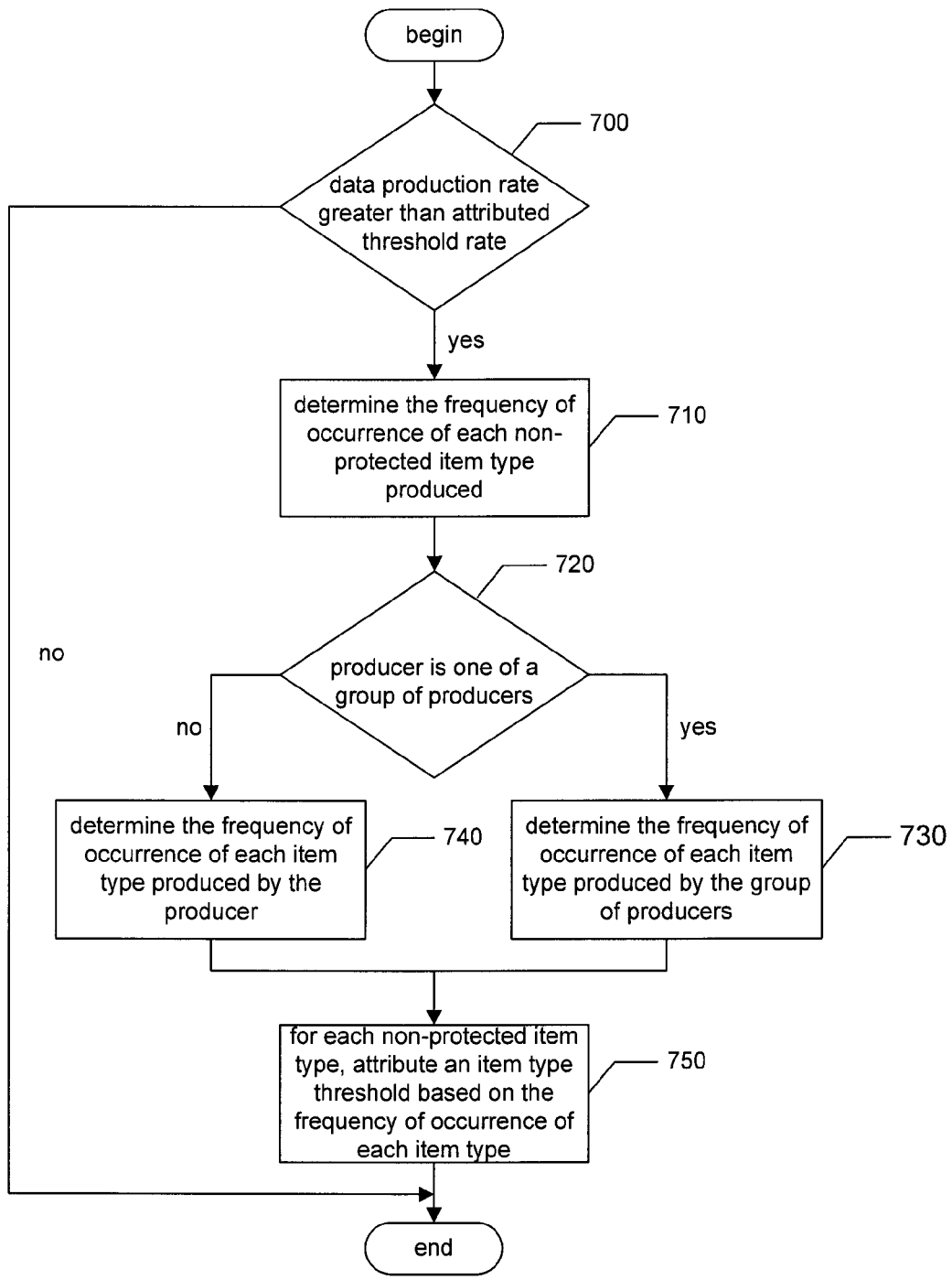
FIG. 7 is a flow diagram showing actions typically performed by the facility in order to rebalance a sampled data stream containing a number of item types, in accordance with one or more embodiments.

FIG. 7 is a flow diagram showing actions typically performed by the facility in order to rebalance a sampled data stream containing a number of item types. At block 700, the facility determines whether a producer's data production rate is greater than its threshold rate. If the facility determines that the producer's data production rate is greater than its threshold rate, then the facility continues to block 710, else the facility returns. At block 710, the facility determines the frequency of occurrence of each non-protected item type produced by the producer. At block 720, the facility determines whether the producer is part of a group of producers. For example, producers 100a and 100z may be considered a group of producers if they are responsible for receiving and responding to requests for a particular service. Producer groups may also be designated by an administrator of the facility, and need not correspond to particular services or applications. If the facility determines that the producer is part of a group of producers, the facility continues to block 730 to determine the frequency of occurrence of each item type produced by any of the producers in the group of producers, else the facility continues to block 740 to determine the frequency of occurrence of each item type produced by the producer.

At block 750, for each non-protected item type, the facility attributes an item threshold based on the frequency of occurrence of each item type. In some embodiments, the facility also groups item types having the same or similar frequencies of occurrence together, such that those item types are sampled as a group. By assigning an item type threshold, the facility may discard data items based on the frequency of occurrence of their item type. Thus, the facility reduces the amount of data processed without significantly affecting the accuracy or timeliness of the information conveyed. After block 750, the routine concludes.

Figure 8:
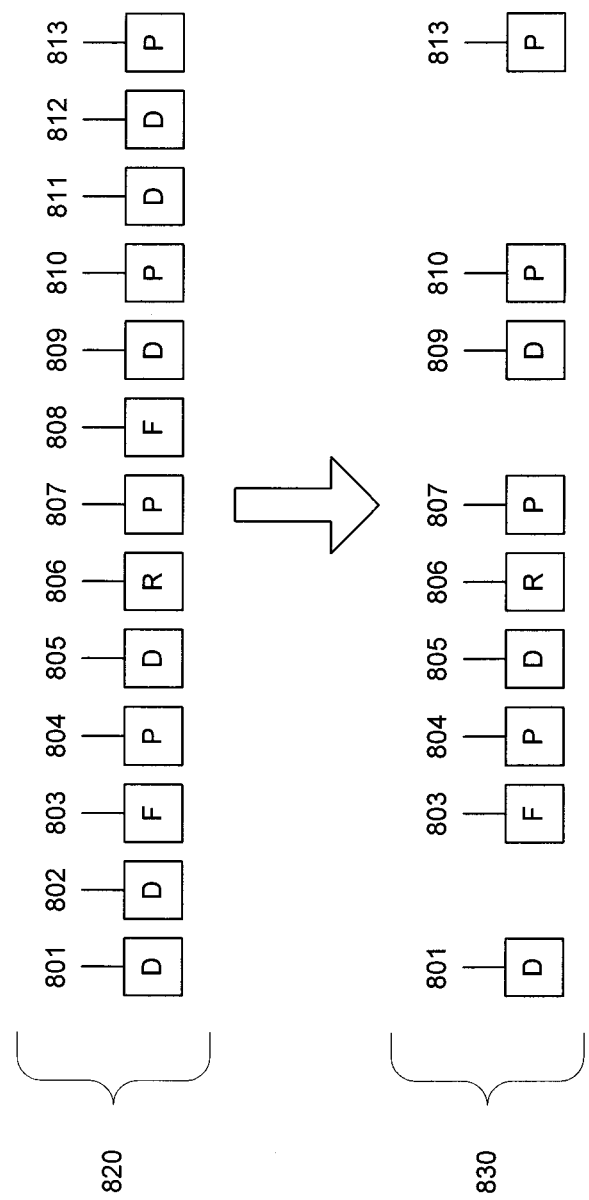
FIG. 8 is a block diagram showing a data stream having a number of types of data items on which the facility operates, in accordance with one or more embodiments.

FIG. 8 is a block diagram showing a produced data stream portion 820 of data items 801-813 each having one of four lettered types on which the facility operates, as well as a corresponding sampled data stream portion 820 that is transmitted to the monitoring system by the facility. For a producer (or group of producers), data items corresponding to item types D and F are produced frequently. In some cases, only a handful of requests dominate the total number of requests for a service. For example, item types D and F may correspond to data items produced by validating a session. Data items corresponding to item type P are protected, and data items corresponding to item type R are produced infrequently. As shown in FIG. 8, when the facility determines that the data production rate for produced stream 810 is greater than a threshold rate, the facility discards non-protected data items in the produced data stream 810 based on the frequency of occurrence of each item type. In this example, because data items having item types D and F are produced frequently (and have nearly the same frequency of occurrence), the facility strongly samples data items of item types D and F, discarding three of the six produced data items of type D and one of the two produced data items of type F. In contrast, because data items having item type R are produced infrequently, the facility weakly samples data items of item type R, failing to discard the one produced data item of this type. Also, in this example, the facility only samples data items having non-protected item types. Thus, data items of item type P are not sampled, such that all four of the data items of this type are retained.

In some embodiments, the facility may determine that the certain producers' data production rates frequently exceed their threshold rates while other producers' data production rates rarely exceed their threshold rates. For example, a capacity processing rate may be divided evenly among producers 100a, 100b, ... 100z, yet producer 100b receives twice the number of requests as producers 100a and 100z receive combined. In these cases, the facility may rebalance the distribution of the capacity processing rate so that producers 100a, 100b, ... 100z receive shares of the processing capacity that are proportional to their data production rates.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A non-transitory computer-readable medium embodying a program executable in a computing device, the program comprising:
   code that obtains a stream of data items from a plurality of producers, each of the producers corresponding to a respective computing device;
   code that transmits at least some of the data items for analysis, wherein all of the data items are transmitted when the data items are being generated at a rate below a threshold, some of the data items are transmitted when the data items are being generated at a rate meeting the threshold, all of the data items corresponding to a protected item type are included within the some of the data items that are transmitted, and at least one data item corresponding to at least one non-protected item type is excluded from the some of the data items that are transmitted based at least in part on a relative frequency of occurrence of the respective non-protected item type in the stream; and
   code that generates at least one system performance metric for each of the producers according to the at least some of the data items that are transmitted for analysis, wherein all of the data items corresponding to the protected item type are necessary for accurately generating the at least one system performance metric.

2. The non-transitory computer-readable medium of claim 1, wherein the at least one data item corresponding to the at least one non-protected item type is excluded from the some of the data items that are transmitted when the relative frequency of occurrence of the respective non-protected item type in the stream is high.

3. The non-transitory computer-readable medium of claim 1, further comprising code that randomly selects one of the data items in the stream that corresponds to a non-protected item type for exclusion from the some of the data items that are transmitted when the data items are being generated at the rate meeting the threshold.

4. A system, comprising:
   at least one computing device; and
   a monitoring system executable in the at least one computing device, the monitoring system comprising:
      logic that obtains a stream of data items;
      logic that generates at least one system performance metric by performing an analysis on at least some of the data items;
      wherein the analysis is performed on all of the data items when the data items are being generated at a rate not meeting a threshold, and the analysis is performed on a subset of the data items when the data items are being generated at a rate meeting the threshold; and
      wherein the subset excludes at least one of the data items that correspond to a non-protected item type, and the subset includes all of the data items that correspond to a protected item type.

5. The system of claim 4, wherein the stream of data items is obtained from a plurality of producers over a data communications network, and each one of the producers corresponds to a distinct computing device.

6. The system of claim 4, wherein the monitoring system further comprises logic that transmits the at least some of the data items over a data communications network to at least one computing system configured to execute the logic that generates at least one system performance metric, and the analysis is performed on all of the at least some of the data items.

7. The system of claim 4, wherein the protected item type corresponds to an item type that is determined to be relatively infrequent in the stream.

8. The system of claim 4, wherein the threshold is set relative to a capacity at which the monitoring system can analyze the data items.

9. The system of claim 4, wherein the protected item type comprises an alert regarding a system performance characteristic.

10. The system of claim 4, wherein the data items in the stream are time sequenced.

11. The system of claim 4, wherein an exclusion of any one of the data items that correspond to the protected item type from the subset would result in the at least one system performance metric being different.

12. The system of claim 4, wherein each one of the at least one system performance metric corresponds to a respective item type.

13. A method, comprising the steps of:
   obtaining, in at least one computing device, a stream of data items;
   determining, in the at least one computing device, a plurality of system performance metrics by analyzing all of the data items when the data items are being generated at a rate not meeting a threshold; and
   determining, in the at least one computing device, the system performance metrics by analyzing a proper subset of the data items when the data items are being generated at a rate meeting the threshold, the proper subset including all of the data items that correspond to a protected item type, each one of the data items that correspond to the protected item type being necessary for determining the system performance metrics.

14. The method of claim 13, wherein the proper subset excludes at least one of the data items corresponding to a non-protected item type.

15. The method of claim 13, wherein an exclusion of any one of the data items that correspond to the protected item type from the proper subset would result in at least one of the system performance metrics being different.

16. The method of claim 13, wherein each data item in the stream is associated with one of a plurality of item types, the item types include a plurality of non-protected item types, and at least one data item corresponding to one of the non-protected item types is excluded from the proper subset based at least in part on a frequency of occurrence of the one of the non-protected item types in the stream.

17. The method of claim 16, wherein the frequency of occurrence is greater than a frequency of occurrence of another one of the non-protected item types in the stream, and at least one data item corresponding to the another one of the non-protected item types is included in the proper subset.

18. The method of claim 13, wherein the stream of data items is obtained from a plurality of producers, and the system performance metrics relate to system performance of the producers.

19. The method of claim 18, wherein each one of the producers comprises a distinct computing device.

20. The method of claim 13, wherein the protected item type is related to an error condition.

* * * * *